United States Patent [19]

Hedley

[11] Patent Number: 4,751,660
[45] Date of Patent: Jun. 14, 1988

[54] DETERMINING ORIENTATION OF TRANSFORMED IMAGE

[75] Inventor: David J. Hedley, Winchester, United Kingdom

[73] Assignee: Sony Corporation, Tokyo, Japan

[21] Appl. No.: 878,709

[22] Filed: Jun. 26, 1986

[30] Foreign Application Priority Data

Jul. 9, 1985 [GB] United Kingdom ............... 8517372

[51] Int. Cl.$^4$ .................. G06F 15/46; G06K 9/48
[52] U.S. Cl. ..................... 364/518; 340/707;
340/723; 340/724; 340/728; 358/101; 382/25;
382/41; 382/44; 364/522
[58] Field of Search ............ 364/513, 518, 523, 559,
364/521, 522; 340/723, 707, 724, 727, 728;
358/48, 77, 101, 22, 140; 382/41, 44, 46, 54, 25, 47

[56] References Cited

U.S. PATENT DOCUMENTS

| | | | |
|---|---|---|---|
| 4,181,953 | 1/1980 | Osofsky | 364/515 |
| 4,368,462 | 1/1983 | Crawley | 340/723 |
| 4,468,688 | 8/1984 | Gabriel et al. | 358/22 |
| 4,475,161 | 10/1984 | Stock | 364/521 |
| 4,484,347 | 11/1984 | Kashioka | 382/47 |
| 4,490,848 | 12/1984 | Beall et al. | 382/121 |
| 4,493,105 | 1/1985 | Beall et al. | 382/21 |
| 4,625,289 | 11/1986 | Rockwood | 364/522 |
| 4,630,225 | 12/1986 | Hisano | 364/559 |
| 4,631,750 | 12/1986 | Gabriel et al. | 382/41 |
| 4,633,503 | 12/1986 | Hinman | 382/47 |
| 4,704,694 | 11/1987 | Czerniejewski | 364/513 |
| 4,709,231 | 11/1987 | Sakaibara et al. | 340/729 |

Primary Examiner—Gary V. Harkcom
Assistant Examiner—Randy W. LaCasse
Attorney, Agent, or Firm—Lewis H. Eslinger

[57] ABSTRACT

A method of processing video signals to achieve a visual effect involving three-dimensional manipulation of an input image includes the use of a circuit for determining pixel address by pixel address whether in the resulting transformed image the front or the back of the input image should be displayed. The circuit comprises a device defining an incremental surface in the transformed image by at least three adjacent non-collinear pixel addresses from the transformed image, a circuit for determining from the transformed pixel addresses whether or not a vector normal to the incremental surface points towards or away from a viewing point, and a device for selecting for display at one of the transformed pixel addresses the corresponding portion of the front or the back of the input image in dependence on whether the vector points towards or away from the viewing point.

10 Claims, 8 Drawing Sheets

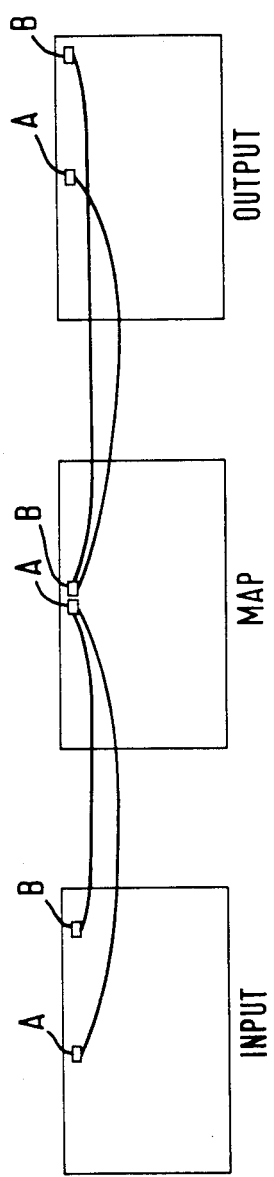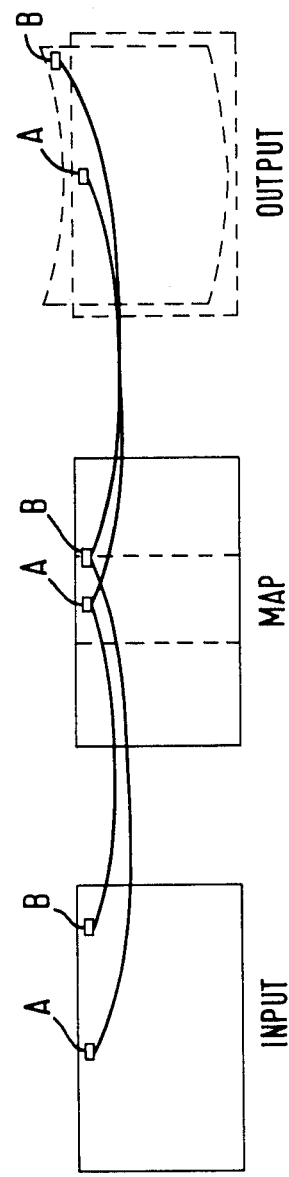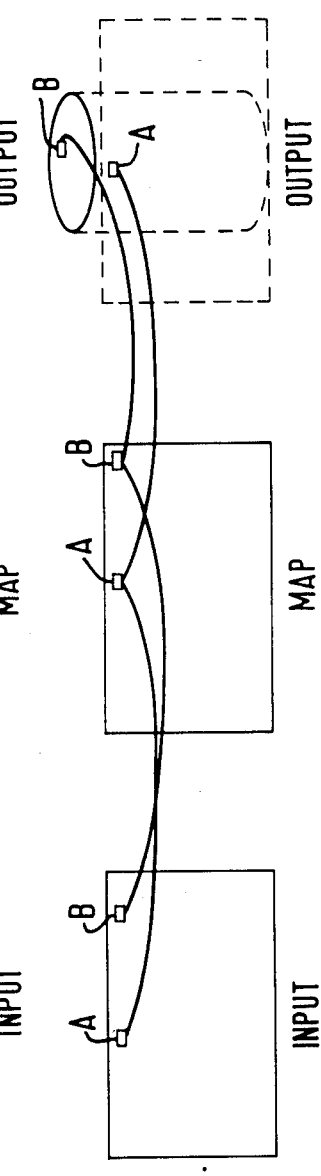

DETERMINING ORIENTATION OF TRANSFORMED IMAGE

BACKGROUND OF THE INVENTION

1. Field of the Invention

This invention relates to methods of and circuits for video signal processing. More particularly, the invention is concerned with distinguishing between the front and the back of an image corresponding to a video signal which has been subjected to special effects processing. Still more particularly, but not exclusively, the invention relates to video signal processing circuits for so distinguishing and which are suitable for use in special effects equipment in high definition video systems.

2. Description of the Prior Art

The standard television signal transmitted in the United Kingdom is a PAL signal of a 625-lines per frame, 50-fields per second system, and the PAL, NTSC and SECAM signals transmitted in other countries use similar or slightly lower line frequencies (for example 525 lines per frame), and similar or slightly higher field frequencies (for example 60 fields per second). While there is no immediate prospect of significant changes in these transmitted signals, there is an increasing requirement for higher definition video systems. Such systems can be used, for example, in film-making, in closed circuit television systems, in satellite communication systems and in studio use generally. One such proposed high definition video system uses 1125 lines per frame and 60 fields per second. This proposed system also uses a 5:3 aspect ratio instead of the 4:3 aspect ratio now usual for television receivers.

The special effects which can be applied to a video signal are well known. Thus, for example, images on a cathode ray tube can be off-set (moved in any direction), scaled (expanded or compressed in size), rolled (rotated) in two or three dimensions and so on.

One way of achieving such special effects, which will be referred to in more detail below, involves converting an input analog video signal into digitized sample values each having a pixel address, modifying the resulting individual pixel addresses to achieve the required special effect, storing the sample values at the modified pixel addresses in a field memory, and reading from the field memory to derive the sample values for reconversion into the required output analog signal.

The effects to be achieved by special effects equipment can in general be divided into two types: those which do not bend or twist the image plane, that is to say linear effects, which may nonetheless be three-dimensional, and those which do distort the image plane by projecting the image onto a three-dimensional shape, that is to say non-linear effects. An example of a three-dimensional linear effect is tilting the input image plane with perspective, as in a tumble or flip. An example of a three-dimensional non-linear effect is the projection of the input image plane onto the surface of a cone.

Two of the processes involved in producing three-dimensional effects whether linear or non-linear are transformation of the initial two-dimensional pixel addresses to pixel addresses in three-dimensional space, and then perspective transformation back onto the two-dimensional viewing plane.

For linear effects, the required two or three-dimensional pixel addresses can be derived by matrix calculation as used, for example, in computer graphics. However, substantial modification of the techniques is necessary to achieve operation in real time as required in a television system. This forms the subject of our copending UK application No. 8511649 (European application No. 86303298.3). For non-linear effects, there is a requirement for methods and circuits which can not only achieve the required effect, but can also do so at the required speeds and without requiring hardware which is too extensive or too complex. This forms the subject of our copending UK application No. 8511648 (European application No. 86303298.3).

In both linear and non-linear three-dimensional effects the possibility exists of the back of the image becoming visible to a viewer. Thus if the input image plane is progressively flipped over, the back of the image will eventually become visible. Likewise if the input image plane is progressively curled into the shape of a hollow cylinder, the back of the image will become visible on the outside of the cylinder, or on the inside of the cylinder if the axis of cylinder is tipped, depending on whether the direction of the curling. What is actually to be seen will depend on whether the image is taken to be transparent, in which case the back of the image will be the same as the front but will appear reversed, or whether the image is taken to be opaque with another image arranged back-to-back with it, in which case the other image will become visible. In either case it is necessary to determine whether the front or the back of the input image will be seen by a viewer.

It might be thought that before transforming the image to achieve the required three-dimensional effect, a set of vectors could be defined normal to the image plane and pointing towards the viewer. After the transformation these vectors could be used to determine whether the front or the back of the image would be visible from the perspective point, by determining the angles of the vectors to the viewing plane. However, such a method would mean that in addition to transforming the pixel addresses of the input image to achieve the required effect, the vectors would also have to be transformed, and this would necessitate substantial additional storage and computation.

OBJECT AND SUMMARY OF THE INVENTION

One object of the present invention is to provide a method of processing video signals to determine whether the front or the back of an image is visible after three-dimensional manipulation of the image.

Another object of the present invention is to provide a method of processing video signals to determine whether a vector normal to an incremental surface of an image points towards or away from a viewing point after three-dimensional manipulation of the image.

Another object of the present invention is to provide a circuit for processing video signals to achieve a visual effect involving three-dimensional manipulation of an input image, including a video signal processing circuit for determining whether in the resulting transformed image the front or the back of the input image should be displayed.

According to the present invention there is provided a method of processing video signals to achieve a visual effect involving three-dimensional manipulation of an input image, including determining whether in the resulting transformed image the front or the back of the input image should be displayed by the steps of:

defining an incremental surface in said transformed image by at least three adjacent non-collinear pixel addresses from said transformed image;

determining from said transformed pixel addresses whether or not a vector normal to said incremental surface points towards or away from a viewing point; and selecting for display at one of said transformed pixel addresses the corresponding portion of the front or the back of said input image in dependence on whether said vector points towards or away from said viewing point.

According to the present invention there is also provided a circuit for processing video signals to achieve a visual effect involving three-dimensional manipulation of an input image, including a video signal processing circuit for determining whether in the resulting transformed image the front or the back of the input image should be displayed, the video signal processing circuit comprising:

means for defining an incremental surface in said transformed image by at least three adjacent non-collinear pixel addresses from said transformed image;

means for determining from said transformed pixel addresses whether or not a vector normal to said incremental surface points towards or away from a viewing point; and means for selecting for display at one of said transformed pixel addresses the corresponding portion of the front or the back of said input image in dependence on whether said vector points towards or away from said viewing point.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 4A, 4B and 4C show diagrammatically the progressive mapping of an initially-flat image onto the surface of a cylinder;

DESCRIPTION OF THE PREFERRED EMBODIMENTS

Figure 1:
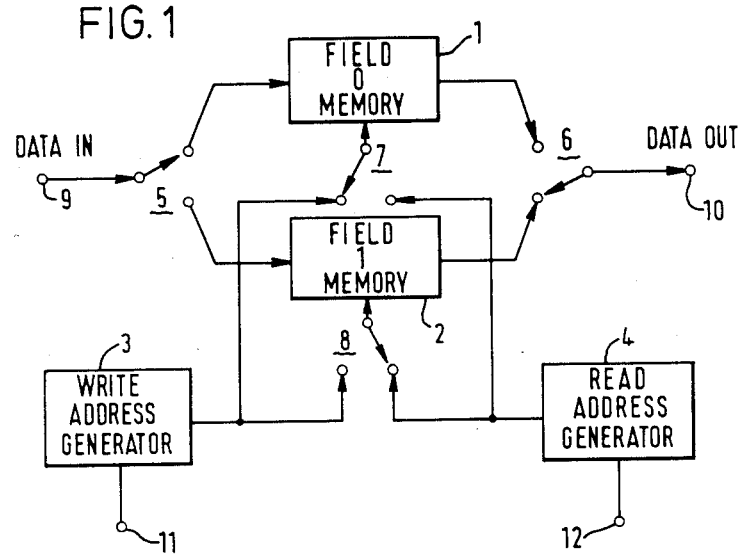
FIG. 1 shows in simplified block form part of a special effects equipment for a high definition video system.

Before describing the embodiment, part of the overall arrangement of an example of a special effects equipment for the high definition video system outlined above will be briefly described with reference to FIG. 1. Basically, the special effects equipment comprises two field memories, a field zero memory 1 and a field one memory 2, together with a write address generator 3 and a read address generator 4. These elements are interconnected by switches 5, 6, 7 and 8, each of which is operated at the field frequency. Input data in the form of digitized sample values supplied to an input terminal 9 are selectively supplied by way of the switch 5 to the field zero memory 1 or the field one memory 2. Output data for supply to an output terminal 10 are selectively derived by the switch 6 from the field zero memory 1 or the field one memory 2. The write address generator 3 and the read address generator 4 are selectively and alternately connected to the field zero memory 1 and the field one memory 2 by the switches 7 and 8.

In operation of this special effects equipment, an input analog signal is sampled 2048 times per horizontal scan line and the resulting sample values are pulse code modulation coded into 8-bit words to form the input digital data which are supplied to the input terminal 9. Writing proceeds alternately in the field zero memory 1 and the field one memory 2 in dependence on the position of the switch 5 and under the control of the write address generator 3. The necessary complex address calculations which are required so as not only to achieve simple writing and reading of the individual digital signals into and out of the appropriate memory 1 or 2, but also to modify the pixel addresses in the cathode ray tube screen raster so as to achieve the required special effect are under control of a signal supplied to the write address generator 3 by way of an input terminal 11. When a complete field has been written in the memory 1 or 2, the switches 5 to 8 change position and the digital signals stored in that memory 1 or 2 are then sequentially read out under the control of the read address generator 4, which in turn is controlled by a signal supplied by way of an input terminal 12, and supplied to the output terminal 10, while the digital signals for the next field are written in the other memory 2 or 1.

Some description will next be given of the way in which three-dimensional non-linear effects are achieved.

Figure 2:
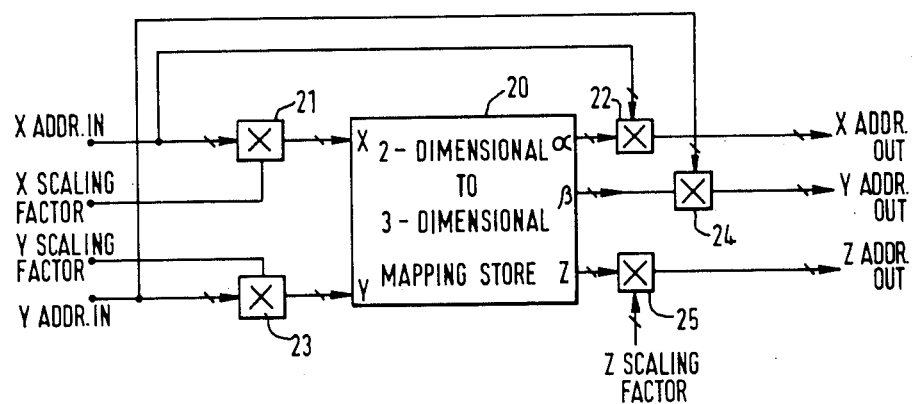
FIG. 2 shows in simplified block from part of a video signal processing circuit.

Referring to FIG. 2, a part of the video signal processing circuit, of which the embodiment to be described below also forms a part, comprises a two-dimensional to three-dimensional mapping store 20 having two main inputs designated X and Y and three main outputs designated $\alpha$, $\beta$ and Z. To the X input, input X addresses of pixels are supplied by way of a multiplier 21, these input X addresses also being supplied to a multiplier 22 connected to the $\alpha$ output. Input Y addresses of pixels are supplied to the Y input by way of a multiplier 23, these input Y addresses also being supplied to a multiplier 24 connected to the $\beta$ output. A multiplier 25 is connected to the Z output. X, Y and Z outputs respectively are derived from the multipliers 22, 24 and 25. The multipliers 21, 23 and 25 can be controlled by an X scaling factor signal, a Y scaling factor signal and a Z scaling factor signal, respectively.

The mapping store 20 is a random access memory (RAM) operating as a look-up table, and is preloaded with data corresponding to the special effect which is to be achieved. Thus, the mapping store 20 contains instructions as to how to map X and Y coordinates corresponding to the pixel addresses in the raster of the two-dimensional input image to three-dimensional space. For each sample position there are stored three parameters; $\alpha$ and $\beta$ which are the X and Y scaling multipliers, and Z which is the absolute depth coordinate. Considering for a moment just one dimension, the effect on each pixel address in a horizontal line scan of the raster in achieving the required special effect is likely to be the horizontal movement of that pixel address to a different address. This change of address can be effected by multiplying the X coordinate of the original address by a scaling multiplier. In practice, the required special effect is likely to affect each pixel address by movement in two dimensions, so multiplication of both the X and Y coordinates of the original address of the pixel by respective scaling multipliers is likely to be required. As, therefore, each pixel address is supplied to the X and Y inputs of the mapping store 20, the mapping store 20 operates to access the appropriate scaling multipliers $\alpha$ and $\beta$ for that pixel address and supply them to the $\alpha$ and $\beta$ outputs. Additionally, however, it is likely that the required special effect will necessitate movement of the pixel address in the third or depth direction also, so a further operation of the mapping store 20 is to access and supply to the Z output thereof, the Z coordinate of the address corresponding to the pixel address designated by the X and Y coordinates of the input addresses and to the required special effect.

The scaling multipliers $\alpha$ and $\beta$ corresponding to the input pixel address are therefore supplied to the multipliers 22 and 24 respectively, which also receive the input X and Y addresses respectively of the input pixel. The multipliers 22 and 24 therefore scale the input X and Y addresses to the required new values which, together with the Z address derived from the mapping store 20, are supplied to the respective outputs.

The purpose of the multipliers 21, 23 and 25 will now be explained. The foregoing description assumes that the transition from the two-dimensional image to the three-dimensional non-linear effect is to be achieved in one step. Commonly, however, it is required that the special effect be achieved progressively over a succession of fields.

Figure 3:
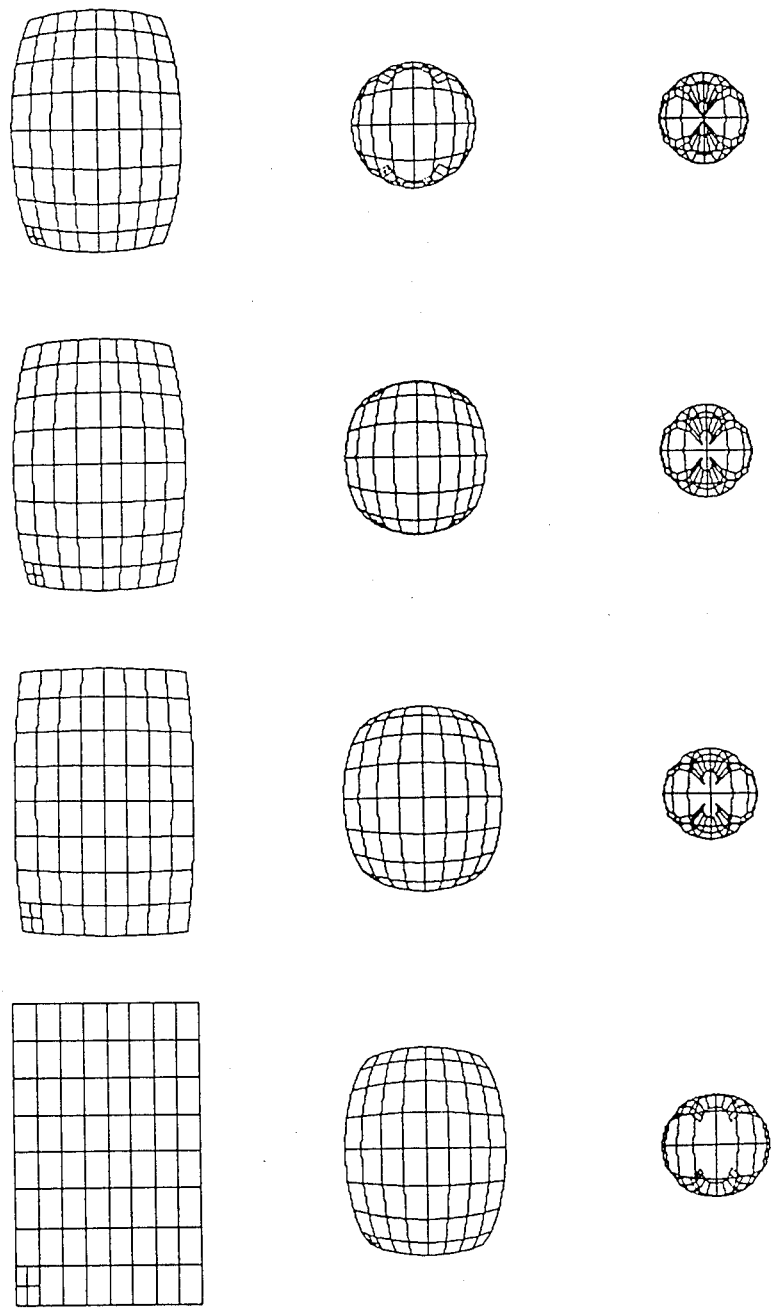
FIG. 3 shows a computer simulation in which an initially-flat 81-point grid is progressively mapped onto the surface of a sphere.

Referring to FIG. 3, suppose that the required special effect is the progressive change of an initial two-dimensional image so that the image appears to be being wrapped around the surface of a sphere. FIG. 3 shows a computer simulation of this special effect in which an initially-flat 81-point grid is progressively mapped onto the surface of a sphere. The first diagram shows the initial flat image and each of the 81 points appears as a rectangle, although it should be remembered that in the digital video signal each of these rectangles simply represents a pixel and so corresponds to a single sample value having X and Y addresses. Following through the diagrams successively will indicate how the sample values move as the special effect is progressively achieved. It will also be seen from the later diagrams, and in particular the final diagram, that as the special effect proceeds the situation arises that there are sample values having the same pixel address so far as the X and Y coordinates are concerned, but different Z addresses. In other words, some sample values have moved behind others. If a transparent effect is required, then both these sample values can be used in forming the output video signal, but if a solid or opaque effect is required, then the sample value nearer the viewing plane, that is having the smaller Z address, can be selected simply by comparison of the Z addresses of sample values having the same X and Y addresses.

Consideration of the final diagram in FIG. 3 will also show that the data to be loaded into the mapping store 20 can be in this case be derived mathematically by calculating the way in which the positions of the individual pixel addresses have to change in moving from the initial two-dimensional image to the final three-dimensional image. Likewise, the necessary data can be calculated mathematically in the case of any special effect which involves mapping the initial two-dimensional image onto a three-dimensional surface which can readily be expressed in mathematical terms, such as the surface of a sphere, cylinder or cone. In the case, however, of a more complex surface such as the surface of a table or a telephone, then an additional computer analysis to map the surface in coordinate terms will first be required, and from this the computer can then calculate the data necessary for loading into the mapping store 20.

In an actual equipment a variety of different sets of $\alpha$ and $\beta$ scaling multipliers and Z coordinates which have been pre-calculated are stored on disc for down-loading into the mapping store 20 when required for use.

Returning now to FIG. 2 and the question of progressively mapping the initial two-dimensional image onto the three-dimensional surface, this is achieved by the use of further scaling multipliers, which, to avoid confusion with the scaling multipliers $\alpha$ and $\beta$ stored in the mapping store 20, will be called scaling factors, and in particular the X, Y and Z scaling factor signals which are supplied to the multipliers 21, 23 and 25 respectively. The effect of the X and Y scaling factor signals is initially to concentrate the input X and Y addresses in the center of the two-dimensional area which is to be mapped onto the three-dimensional shape. The X and Y scaling factor signals then change progressively so that the addresses are in effect spread outwards to the boundaries to the three-dimensional shape. This spreading takes place progressively by progressively altering the values of the X and Y scaling factor signals.

This may be seen by reference to FIGS. 4A to 4C which shows the input, map and output at initial, intermediate and final stages respectively in mapping an initial two-dimensional image onto the surface of a cylinder. Throughout the progression the address of the pixel A at top center of the initial image remains unchanged both by the scaling factors and the mapping, so the output address of the pixel A is the same as the input address. However, the address of a pixel B initially at top right is brought close to the center by operation of the scaling factors in the initial stage shown in FIG. 4A, so the output address of pixel B is not at this initial stage substantially changed by the scaling multipliers in the mapping. At the intermediate stage shown in FIG. 4B, the address of the pixel B is not brought so close to the center, so it is affected to some extent by the scaling multipliers in the mapping, and the output address shows the pixel B starting to move away from its original position as the initially flat plane of the image starts to curl to take up the shape of a cylinder. In the final stage shown in FIG. 4C, the scaling factors do not affect the input address of the pixel B, so the scaling multipliers in the mapping take full effect on this address and the output address of the pixel B is moved substantially, and in fact to the position which it is to occupy on the final cylindrical-shaped image.

It will be noted that in this case, as in the case of mapping onto the surface of a sphere as shown in FIG. 3, the addresses of some pixels have moved behind others. As mentioned above, if a transparent effect is required, then both these pixels can be used in forming the output video signal, but if a solid or opaque effect is required, then the pixel nearer the viewing plane, that is the one having the smaller Z address, can be selected simply by comparison of the Z addresses of the pixels having the same X and Y addresses. It will also be noted that in this case, because the axis of the cylinder is slightly tilted, part of the inside of the cylinder, that is of the back of the input image, eventually becomes visible. This will be referred to in more detail below.

Figure 5:
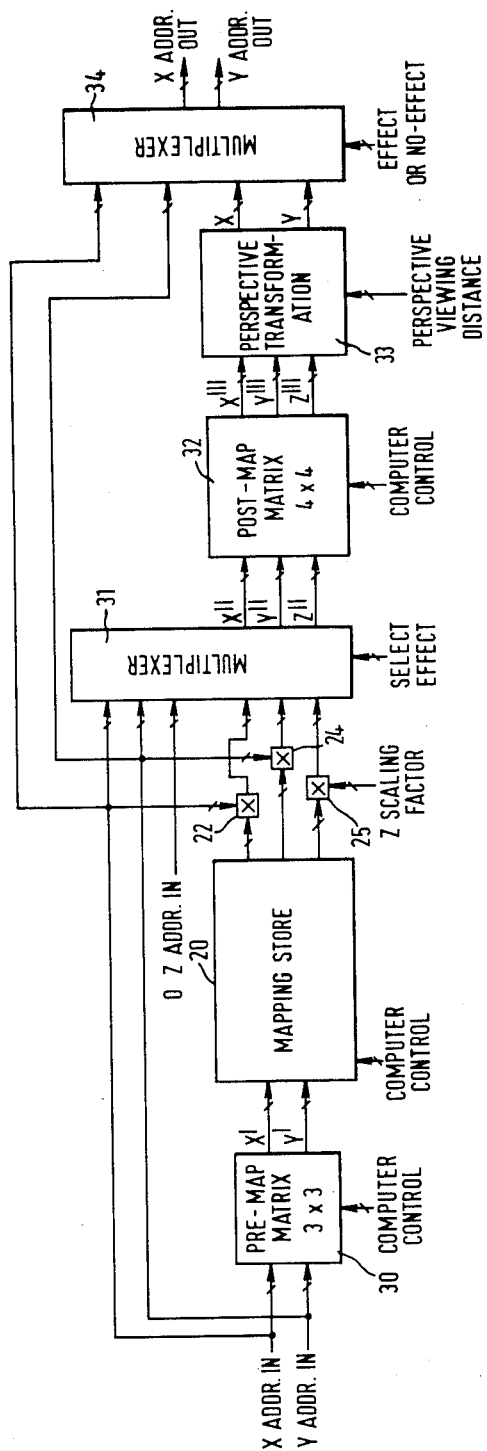
FIG. 5 shows in more detailed, but still simplified, block form the video signal processing circuit part of which is shown in FIG. 2.

Referring now to FIG. 5, this shows the video signal processing circuit in more detail, although still in simplified block form. This figure shows, in addition to the mapping store 20 and the multipliers 22, 24 and 25 (the multipliers 21 and 23 not being shown merely to simplify the figure); a pre-map matrix 30, a multiplexer 31, a post-map matrix 32, a perspective transformation device 33 which comprises the embodiment of the invention to be described below and a further multiplexer 34. The input X and Y addresses are supplied to respective inputs of the pre-map matrix 30, the multipliers 22 and 24 as previously described, respective inputs of the multiplexer 31, and respective inputs of the multiplexer 34. Additionally the multiplexer 31 receives a zero Z input address, which is the Z address corresponding to all X and Y addresses on the initial two-dimensional image. Three further inputs of the multiplexer 31 respectively receive the outputs of the multipliers 22, 24 and 25, these being the X, Y and Z addresses respectively corresponding to the pixels of the input video data mapped in accordance with the required special effect.

The multiplexer 31 is operative under control of a linear/non-linear effect control signal to select either the initial input addresses or the input addresses after mapping, that is to say to include the non-linear special effect or not as required. The three output addresses supplied by the multiplexer 31, designated the X", the Y" and the Z" addresses are supplied to the post-map matrix 32, which supplies output X''', Y''' and Z''' addresses to the perspective transformation device 33. The perspective transformation device 33 also receives a perspective viewing distance control signal and supplies output addresses designed X and Y to the multiplexer 34. The multiplexer 34 also receives the input X and Y addresses, and under control of an effect/no-effect control signal supplies either the input X and Y addresses unchanged, or the output X and Y addresses derived in accordance with the required non-linear special effect and by the post-map matrix 32 and the perspective transformation device 33, or, if the multiplexer 31 is controlled so that the input X and Y addresses by-pass the pre-map matrix 30 and the mapping store 20, the output X and Y addresses derived by the post-map matrix 32 and the perspective transformation device 33 only.

Briefly, the pre-map matrix 30 is operative to cause any one or any combination of the two-dimensional effects of off-setting (shifting or translating the image in its plane), scaling (expanding or compressing the image) and rolling (rotating). Thus, for example, rotation about a noncentral point involves the combination of off-setting to the point, rotation about that point and off-setting back to the initial position. These effects are all well known, and the necessary matrices are described in "Computer Graphics and Applications" by Dennis Harris, Chapman and Hall Computing 1984. To achieve each individual effect a 3×2 matrix is sufficient, but a third line is added simply to make the matrices 3×3, so that any two or more matrices can readily be multiplied together to give the required combination of effects. This multiplication is done in a microcomputer and when required, the resultant matrix is down-loaded as a set of coefficients for the pre-map matrix 30, which comprises multipliers and adders.

Briefly, the post-map matrix 32 is operative to cause any one or any combination of the three-dimensional effects of off-setting (which may be in two dimensions only), scaling, rolling, pitching and yawing. These effects also are all well known, and the necessary matrices are described in "Computer Graphics and Applications" referred to above. In this case to achieve each individual effect a 4×3 matrix is sufficient, but a fourth line is added simply to make the matrices 4×4, so that any two or more matrices can readily be multiplied together to give the required combination of effects, such as rolling about an off-set point, which involves off-setting, rolling and off-setting back, in which case, the three appropriate matrices are multiplied together to give a single matrix corresponding to the required effect. This multiplication is done in a microcomputer and when required, the resultant matrix is down-loaded as a set of coefficients for the post-map matrix 32, which comprises multipliers and adders.

Figure 6:
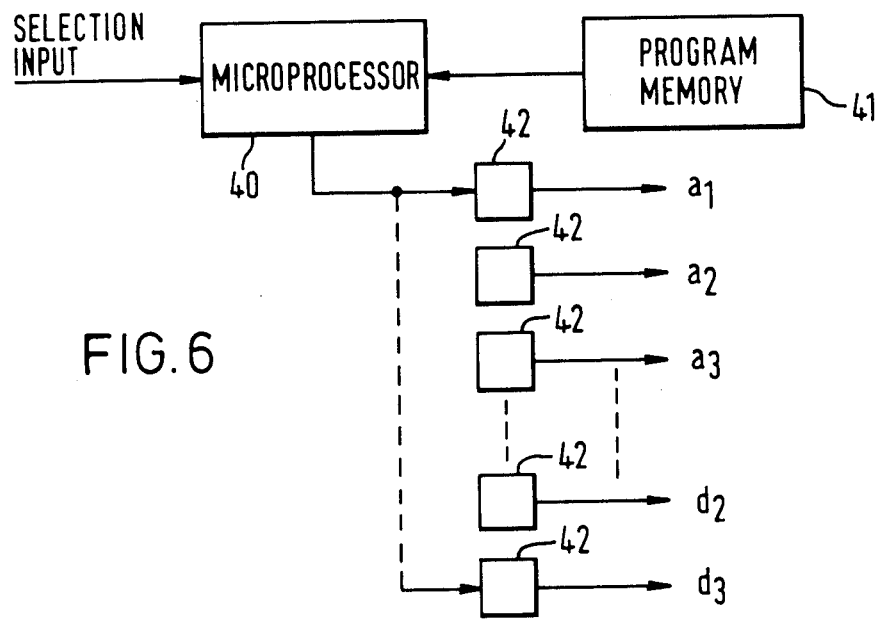
FIG. 6 shows in more detailed block form part of the video signal processing circuit of FIG. 5.

A video signal processing circuit which may be used as the post-map matrix 32 will now be described with reference to FIGS. 6 and 7. From this it will be readily apparent how the rather simpler pre-map matrix 30 can be realised in a similar way.

As mentioned above, the mathematical operations which the post-map matrix 32 has to perform to achieve the three-dimensional effects of off-setting, scaling, rolling, yawing and pitching are known, for example, from "Computer Graphics and Applications" referred to above. However, in the present case the images must be processed in real time, that is, all the processing necessary for each field must be performed at the video field rate, which, in the present example is 60 fields per second. It is not possible for a computer to perform the processing at the required high speed, so the embodiment comprises a hybrid arrangement comprising a high speed microprocessor and a hardware matrix circuit. Basically, the microprocessor is required to calculate the coefficients of a single 4×4 matrix which is, if necessary, a composite matrix combining the matrices corresponding respectively to two or more of off-setting, scaling, rolling, pitching or yawing.

Suppose that the three-dimensional input address of a pixel is x, y, z and that the output address, after a required transformation, of that pixel is x new, y new, z new. In the general case, therefore, where the precise transformation has not yet been specified:

$$x \text{ new} = a_1 x + b_1 y + c_1 z + d_1$$

$$y \text{ new} = a_2 x + b_2 y + c_2 z + d_2$$

$$z \text{ new} = a_3 x + b_3 y + c_3 z + d_3$$

where $a_1$, $a_2$, $a_3$, $b_1$, $b_2$, $b_3$, $c_1$, $c_2$, $c_3$, $d_1$, $d_2$ and $d_3$ are coefficients determined by the transformation to be performed. Writing the above three equations in matrix form:

$$\begin{vmatrix} x \text{ new} \\ y \text{ new} \\ z \text{ new} \end{vmatrix} = \begin{vmatrix} a_1 & b_1 & c_1 & d_1 \\ a_2 & b_2 & c_2 & d_2 \\ a_3 & b_3 & c_3 & d_3 \end{vmatrix} \begin{vmatrix} x \\ y \\ z \\ 1 \end{vmatrix}$$

To make the center matrix 4×4, so as to permit multiplication of such matrices, this can be re-written as:

$$\begin{vmatrix} x \text{ new} \\ y \text{ new} \\ z \text{ new} \\ 1 \end{vmatrix} = \begin{vmatrix} a_1 & b_1 & c_1 & d_1 \\ a_2 & b_2 & c_2 & d_2 \\ a_3 & b_3 & c_3 & d_3 \\ 0 & 0 & 0 & 1 \end{vmatrix} \begin{vmatrix} x \\ y \\ z \\ 1 \end{vmatrix}$$

As explained in more detail in our above-mentioned copending UK application No. 8511649, any one or any combination of the above three-dimensional linear effects of off-setting, scaling, rolling, pitching and yawing can be achieved by first selecting the appropriate matrix, or in the case of a combination selecting the appropriate matrices, substituting the required values of the parameters into the matrix or matrices, and, in the case of a combination multiplying the resulting matrices together. This first step is carried out by a microprocessor 40 shown in FIG. 6 under control of a program stored in a program memory 41 and selection inputs which specify which of the off-setting, scaling, rolling, pitching and yawing effects are required and, in the appropriate cases, the off-set distances, the scaling coefficients and the roll, pitch and yaw angles. Under control of the program, the microcomputer 40 then selects the appropriate 4×4 matrix or matrices, substitutes the parameters and, where necessary, multiplies the resulting matrices together to provide in each case an output matrix comprising the required coefficients $a_1$ to $d_3$ which are supplied to respective outputs by way of latch circuits 42. During each field period of the video signal to be processed the microprocessor 40 performs the above operations so that the required coefficients $a_1$ to $d_3$ are available for use in the next field period.

Figure 7:
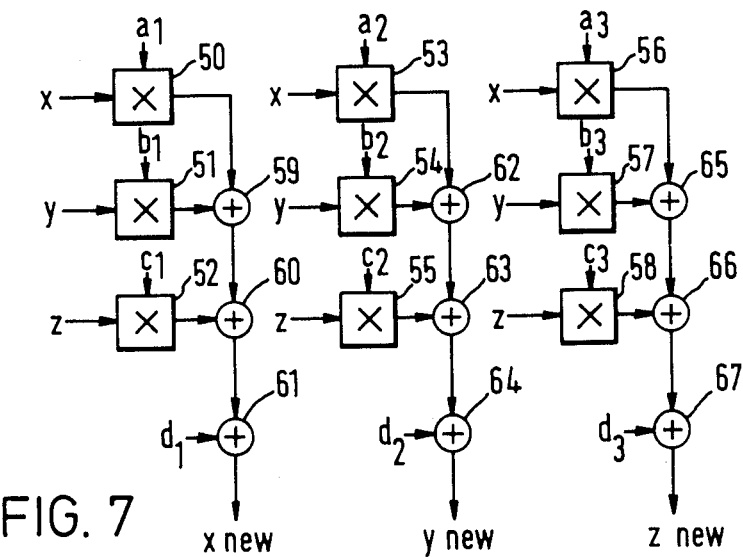
FIG. 7 shows in more detailed block form another part of the video signal processing circuit of FIG. 5.

The coefficients $a_1$ to $d_3$ are supplied to the hardware matrix circuit shown in block form in FIG. 7. The matrix circuit comprises nine multipliers 50 to 58 and nine adders 59 to 67. The output x new of each pixel in a field is derived by supplying the input coordinates x, y and z of that pixel to the multipliers 50, 51 and 52 respectively, where they are multiplied by the coefficients $a_1$, $b_1$ and $c_1$ respectively down-loaded from the microcomputer 40 at the end of the previous field. The outputs of the multipliers 50 and 51 are added by the adder 59, the output of the adder 59 is added to the output of the multiplier 52 by the adder 60, and the output of the adder 60 is added to the coefficient $d_1$ by the adder 61.

The output of the adder 61 is x new. The outputs y new and z new are derived similarly.

The three outputs x new, y new and z new correspond to X''', Y''' and Z''' and are supplied to the perspective transformation device 33 shown in FIG. 5.

As mentioned above, the form and operation of the pre-map matrix 30 is similar, but with the simplification that because only the two-dimensioned linear effects of off-setting, scaling and rolling are involved, the matrices are 3×3, and the matrix circuit is correspondingly simplified.

The perspective transformation device 33 introduces geometrical perspective by adapting the X''' and Y''' addresses in dependence on the Z''' addresses and on the selected viewing distance. This again is a known technique and the way it is done is described in "Computer Graphics and Applications" referred to above. The need to effect perspective transformation will be understood from a very simple example. Suppose an initial two-dimensional rectangular image is hinged rearwards about a horizontal axis coinciding with the top edge of the image. As this is done each pixel in the image will acquire a Z address (which will be zero for pixels lying along the axis), but initially the length of the bottom edge of the image will remain the same as the length of the top edge of the image. In other words there will be no perspective effect to delude the eye that the movement is in three dimensions. The function of the perspective transformation device 33 is to add the required geometrical perspective effect, which in the above simple example involves shortening the bottom edge, and progressively shortening the intervening horizontal lines.

Figure 8A:
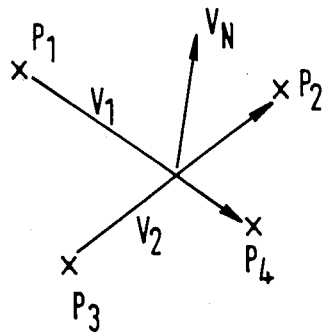
FIG. 8A shows diagrammatically four adjacent pixel addresses after transformation.

Another function performed by the perspective transformation device, and with which the present invention is particularly concerned is distinguishing between the front and the back of an image. This function can be performed before or after the perspective transformation. Before is theoretically better, but after has been found to be satisfactory in practice. Distinguishing between the front and the back of an image is done by consideration of the orientation of a surface defined by a minimum of three non-collinear pixel addresses. To understand why a minimum of three pixel addresses are required consider FIG. 8A which shows four adjacent pixel addresses $P_1$, $P_2$, $P_3$ and $P_4$ after transformation. These three-dimensional pixel addresses can be used to define two diagonal vectors $V_1$ and $V_2$ between the pixel addresses $P_1$ and $P_4$, and $P_3$ and $P_2$ respectively, in terms of the pixel addresses. Then, taking the cross product of the vectors $V_1$ and $V_2$, the vector $V_N$ normal to the surface can be defined in terms of the pixel addresses. If this vector $V_N$ is pointing towards the viewer, then the front of the input image will be visible, while if it is pointing away from the viewer, the back of the input image will be visible.

Figure 8B:
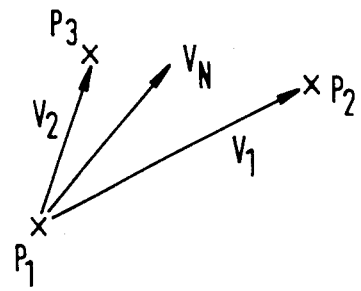
FIGS. 8B and 8C show diagrammatically three adjacent pixel addresses after transformation.

However, as shown in FIG. 8B, the determination can be done using only three pixel addresses $P_1$, $P_2$ and $P_3$, as this is sufficient to define a surface, which in this case will be planar, and the required two vectors $V_1$ and $V_2$ between say the pixel addresses $P_1$ and $P_2$, and $P_1$ and $P_3$ respectively, in terms of the pixel addresses.

Figure 9A:
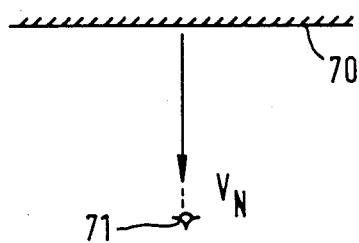
FIG. 9A shows a diagrammatic plan view of an input image.
Figure 9B:
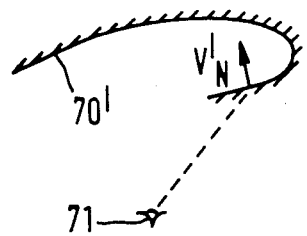
FIG. 9B shows a diagrammatic plan view of an image after transformation.

The use of four pixel addresses $P_1$, $P_2$, $P_3$ and $P_4$ will now be described in more detail with reference to FIGS. 9 to 11. FIG. 9A is a plan view of a two-dimensional input image 70, indicating also a viewer 71. The vector $V_N$ normal to the image 70 points towards the viewer 71. FIG. 9B is similar, but shows the resulting image 70' after a transformation in which the image 70 is curled. In this case a vector $V'_N$, for example, which is normal to an incremental surface somewhat off-set from the center of the image 70' points away from the viewer 71, so the back of that surface would be seen, but it should be noted that there are incremental surfaces in the image 70' where the front of the surface will be seen.

Figure 10A:
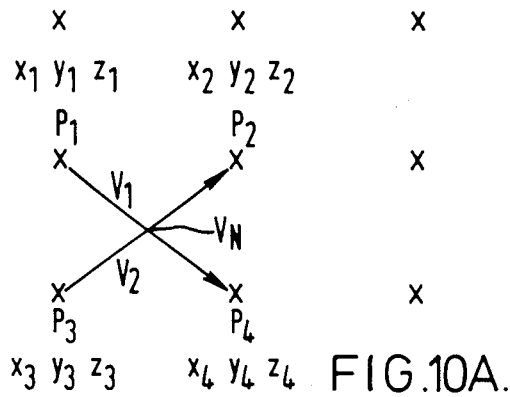
FIG. 10A shows diagrammatically part of a raster of pixel addresses before transformation.
Figure 11:
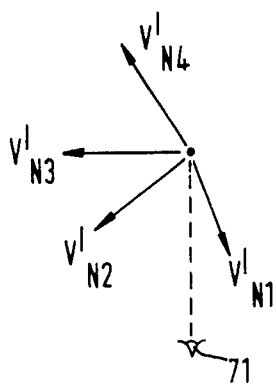
FIG. 11 shows diagrammatically examples of vectors normal to a transformed image.

FIG. 10A shows part of an orthogonal array of samples or pixel addresses in three successive horizontal scan lines in the raster of one field of an input image. To determine whether after transformation the front or the back of the image will be visible to a viewer at say the sample with the pixel address $P_1$, the pixel addresses at $P_1$, $P_2$, $P_3$ and $P_4$ are used to define a plane P in terms of diagonal vectors $V_1$ and $V_2$. It is assumed that the three-dimensional pixel addresses $P_1$, $P_2$, $P_3$ and $P_4$ are $x_1$, $y_1$, $z_1$; $x_2$, $y_2$, $z_2$; $x_3$, $y_3$, $z_3$; and $x_4$, $y_4$, $z_4$. By deriving the cross product of the vectors $V_1$ and $V_2$ a vector $V_N$ normal to the surface can be defined, and the vector $V_N$ will of course point towards the viewer because the input image is flat and normal to the line of view.

Figure 10B:
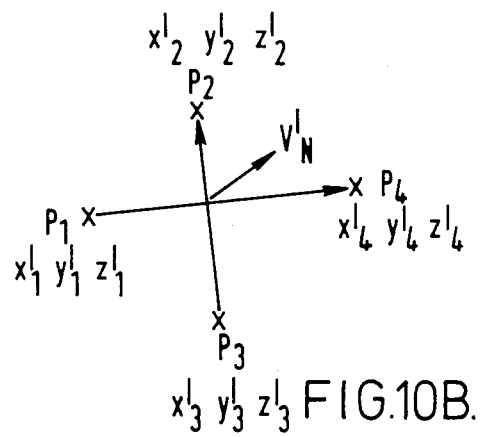
FIG. 10B shows diagrammatically four pixel addresses of FIG. 10A after transformation.

FIG. 10B shows the same pixel addresses $P_1$, $P_2$, $P_3$ and $P_4$ after transformation when they have become $P'_1$, $P'_2$, $P'_3$ and $P'_4$ respectively or $x'_1$, $y'_1$, $z'_1$; $x'_2$, $y'_2$, $z'_2$; $x'_3$, $y'_3$, $z'_3$; and $x'_4$, $y'_4$ and $z'_4$. Again vectors $V'_1$ and $V'_2$ can be defined, and from the cross product a vector $V'_N$ normal to the incremental surface containing the transformed pixel addresses $P'_1$, $P'_2$, $P'_3$ and $P'_4$ can be defined. Depending on the nature of the transformation the normal $V'_N$ may be pointing in any direction, and FIG. 11 shows four examples $V'_{N1}$ to $V'_{N4}$. It will be seen from this figure that $V'_{N1}$ and $V'_{N2}$ require the front of the image to be displayed and $V'_{N4}$ requries the back of the image to be displayed. $V'_{N3}$ represents the case where the plane of the incremental surface is edge on to the viewer, so it does not matter whether the front or the back of the image is displayed.

In other words, if $\theta$ is the angle between the direction of the vector $V'_N$ and the direction pointing away from the viewer, then if:

$$90° > \theta > 270°$$

the back of the image must be displayed, and in all other cases the front of the image must be displayed. By deriving an expression for $\cos \theta$ it can be shown that this can be determined simply by evaluating the sign of N, where:

$$N = (y'_4 - y'_1)(x'_2 - x'_3) - (x'_4 - x'_1)(z'_2 - y'_3)$$

because N is the numerator of the expression for $\cos \theta$ and the denominator of the expression is always positive. The necessary evaluation can be done quite readily in the perspective transformation device 33 (FIG. 5), in particular because the above expression for N only includes values from the transformed pixel addresses, so it is not necessary additionally to supply the untransformed pixel addresses to the perspective transformation device 33, and in fact does not use the z or depth addresses. If N is positive, then:

$$90° > \theta > 270°$$

and the back of the image is required, and if N is negative:

$$90° > \theta > 270°$$

in which case the front of the image is required.

Figure 12:
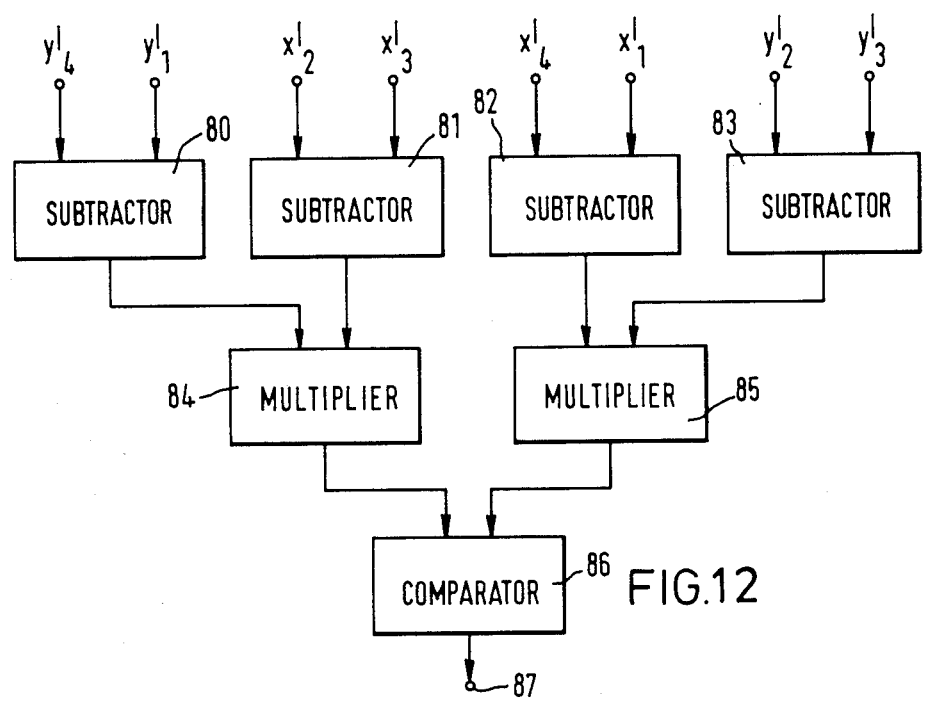
FIG. 12 shows in block form an embodiment of video signal processing circuit according to the present invention and which may form a part of the video signal processing circuit of FIG. 5.

FIG. 12 shows in block form an embodiment of circuit for effecting the required evaluation. The circuit comprises four subtractors 80 to 83, each having two inputs and an output. The outputs of the subtractors 80 and 81 are connected to respective inputs of a multiplier 84, and the outputs of the subtractors 82 and 83 are connected to respective inputs of a multiplier 85. The multipliers 84 and 85 each have an output which is connected to a respective input of a comparator 86 which supplies an output to a terminal 87.

At each pixel address the values (magnitude and sign) of $y'_4$ and $y'_1$; $x'_2$ and $x'_3$; $x'_4$ and $x'_1$; and $y'_2$ and $y'_3$ are supplied to the respective inputs of the subtractors 80 to 83 respectively. The outputs supplied by the subtractors 80 to 83 represent the values (magnitude and sign) of the differences between the respective inputs, and these output values are multiplied in the respective pairs by the multipliers 84 and 85. The comparator 86 then compares the two multiplied outputs, which correspond respectively to the two terms in the above expression for N, to evaluate whether N is positive or negative, and supplies a front/back signal to the output terminal 87 as appropriate.

The way in which the front/back signal is used will depend on the effect required. If there is only a single input image, then the back of the image is in fact the same as the front at every individual pixel address, but nevertheless if due to some transformation the back of the image becomes visible to the viewer it may be required to distinguish it visibly from the front, for example by giving it a color cast or lowering its luminance. Alternatively, the back of the image may be shown as pure black or white.

Moreover, the above technique is of particular utility where the input image is double-sided, that is to say, consists of first and second different images notionally arranged back-to-back. In this case, when the back of the input image is to become at least partially visible, appropriate sample values from the second image are displayed in place of the corresponding sample values from the first image. To achieve this, complete processing of both images is required, so that the two images are available at the point where in respect of each pixel address the appropriate sample value from the first or the second image is selected in dependence on the front-/back signal.

The determination described above is effected for each pixel address in the image, so that the front and back of the image is correctly displayed over the whole of each field.

Figure 10C:
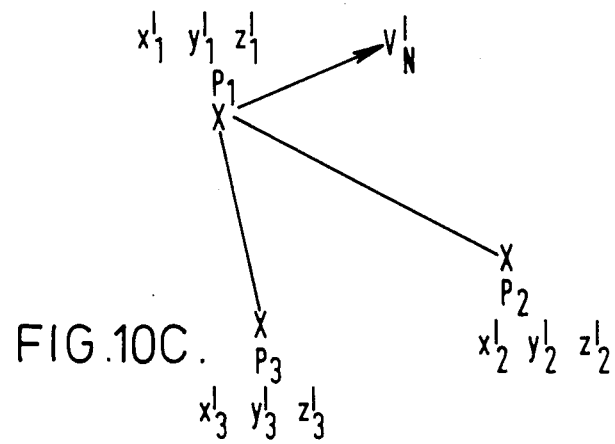
FIG. 10C shows diagrammatically three pixel addresses of FIG. 10A after transformation.

The use of three pixel addresses $P_1$, $P_2$ and $P_3$ will now be further described. FIG. 10C, which corresponds to FIG. 10B, shows the pixel address $P_1$, $P_2$ and $P_3$ after transformation when they have become $P'_1$, $P'_2$ and $P'_3$ respectively or $x'_1$, $y'_1$, $z'_1$; $x'_2$, $y'_2$, $z'_2$; and $x'_3$, $y'_3$, $z'_3$. Again vectors $V'_1$ and $V'_2$ can be defined, and from the cross product a vector $V'_N$ normal to the incremental surface containing the transformed pixel addresses $P'_1$, $P'_2$ and $P'_3$ can be defined. As described above for the case of four pixel addresses, by deriving an expression for $\cos \theta$ it can be shown that it is only necessary to evaluate the sign of N, where, in this case:

$$N = (y'_3 - y'_1)(x'_2 - x'_1) - (x'_3 - x'_1)(y'_2 - y'_1)$$

Figure 8C:
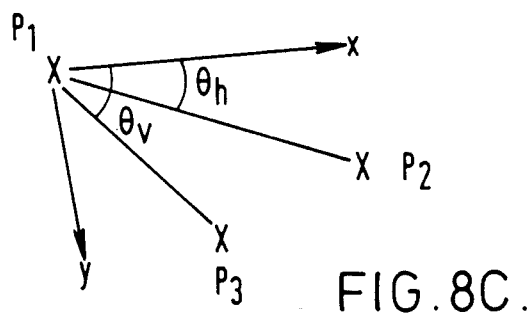

While this may be done generally as described above with reference to FIG. 12, there may, in some embodiments, be a possible simplification. In FIG. 8C, which corresponds generally to FIG. 8B, there are shown angles $\theta_h$ and $\theta_v$ between the x-axis and P'$_1$P'$_2$, and the x-axis and P'$_1$P'$_3$, respectively. In some embodiments the angles $\theta_h$ and $\theta_v$ are available in the form of tan $\theta_h$ and tan $\theta_v$. Where this is so, it can be seen by comparison of the expressions:

$$\tan\theta_h = \frac{y'_2 - y'_1}{x'_2 - x'_1}$$

and $$\tan\theta_v = \frac{y'_3 - y'_1}{x'_3 - x'_1}$$

with the expression for N given above, that if:

$$\tan\theta_h > \tan\theta_v$$

then N is positive and the back of the image is required, while otherwise N is negative and the front of the image is required.

In this case, in place of the circuit of FIG. 12, it is only necessary to provide a comparator 86 to compare the values of tan $\theta_h$ and tan $\theta_v$.

Although described in relation to the above high definition video system, it will be realised that the invention can equally well be applied to the processing of any video signal which can be expressed in the necessary digital form.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing video signals to achieve a visual effect involving three-dimensional manipulation of an input image includes determining whether in a resulting transformed image the front or the back of the input image should be displayed by the steps of:
   defining an incremental surface in said transformed image by at least three adjacent non-collinear pixel addresses from said transformed image;
   determining from said transformed pixel addresses whether a vector normal to said incremental surface points towards or away from a viewing point; and
   selecting for display at one of said transformed pixel addresses the corresponding portion of the front or the back of said input image in dependence on whether said vector points towards or away from said viewing point.

2. A method according to claim 1 wherein three said transformed pixel addresses are used to define said incremental surface.

3. A method according to claim 2 wherein said three transformed pixel addressses are x'$_1$, y'$_1$, z'$_1$, x'$_2$, y'$_2$, z'$_2$; and x'$_3$, y'$_3$, z'$_3$ respectively, and in said determining step whether said vector points towards or away from said viewing point is determined by evaluating the sign of N where:

$$N=(y'_3-y'_1)(x'_2-x'_1)-(x'_3-x'_1)(y'_2-y'_1)$$

4. A method according to claim 1 wherein four said transformed pixel addresses are used to define said incremental surface.

5. A method according to claim 4 wherein said four transformed pixel addresses are x'$_1$, y'$_1$, z'$_1$; x'$_2$, y'$_2$, z'$_2$; x'$_3$, y'$_3$, z'$_3$; and x'$_4$, y'$_4$, z'$_4$ respectively, and in said determining step whether said vector points towards or away from said viewing point is determined by evaluating the sign of N where:

$$N=(y'_4-y'_1)(x'_2-x'_3)-(x'_4-x'_1)(y'_2-y'_3)$$

6. A method according to claim 1 wherein a first input image corresponds to the front of said input image and a second, different input image corresponds to the back of said input image, and wherein in said selecting step there is selected for display at said transformed pixel address the corresponding portion of said first or said second input image in dependence on whether said vector points towards or away from said viewing point respectively.

7. A circuit for processing video signals to achieve a visual effect involving three-dimensional manipulation of an input image, including a video signal processing circuit for determining whether in a resulting transformed image the front or the back of the input image should be displayed, the video signal processing circuit comprising:
   means for defining an incremental surface in said transformed image by at least three adjacent non-collinear pixel addresses from said transformed image;
   means for determining from said transformed pixel addresses whether a vector normal to said incremental surface points towards or away from a viewing point; and
   means for selecting for display at one of said transformed pixel addresses the corresponding portion of the front or the back of said input image in dependence on whether said vector points towards or away from said viewing point.

8. A circuit according to claim 7 wherein three or four said transformed pixel addresses are used to define said incremental surface.

9. A circuit according to claim 7 wherein a first input image corresponds to the front of said input image and a second, different input image corresponds to the back of said input image, and wherein in said selecting step there is selected for display at said transformed pixel address the corresponding portion of said first or said second input image in dependence on whether said vector points towards or away from said viewing point respectively.

10. A circuit according to claim 7 wherein said means for determining comprises a comparator circuit.

* * * * *

UNITED STATES PATENT AND TRADEMARK OFFICE
CERTIFICATE OF CORRECTION

PATENT NO. : 4,751,660
DATED : June 14, 1988
INVENTOR(S) : David J. Hedley

It is certified that error appears in the above-identified patent and that said Letters Patent is hereby corrected as shown below:

Column 2, line 20, delete "whether";
         line 44, change "OBJECT" to --OBJECTS--.
Column 3, line 69, "FIG. 10C" should be new paragraph.
Column 6, line 16, delete "be" first occurence.
Column 7, line 10, change "cylindrical" to --cylindrically--;
         line 54, change "$Y''$" to --$Y'''$--.
Column 10, line 8, change "dimensioned" to --dimensional--.
Column 11, line 33, change "requries" to --requires--.

IN CLAIMS
Column 13, last line, change "$z'_1,$" to --$z'_1;$--.

Signed and Sealed this

Twenty-first Day of February, 1989

Attest:

DONALD J. QUIGG

*Attesting Officer*      *Commissioner of Patents and Trademarks*